(12) United States Patent
Kato et al.

(10) Patent No.: US 7,646,925 B2
(45) Date of Patent: Jan. 12, 2010

(54) IMAGE PROCESSING APPARATUS, IMAGE PROCESSING METHOD, PROGRAM, AND STORAGE MEDIUM

(75) Inventors: Shinichi Kato, Kawasaki (JP); Naoki Ito, Tokyo (JP); Osamu Iinuma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 711 days.

(21) Appl. No.: 11/229,560

(22) Filed: Sep. 20, 2005

(65) Prior Publication Data

US 2006/0072164 A1    Apr. 6, 2006

(30) Foreign Application Priority Data

Sep. 28, 2004   (JP)   ............................. 2004-282480

(51) Int. Cl.
*G06K 9/36*   (2006.01)
*G06K 9/46*   (2006.01)
(52) U.S. Cl. ..................... 382/232; 382/233; 382/239
(58) Field of Classification Search .............. 382/232, 382/233, 239
See application file for complete search history.

(56) References Cited

U.S. PATENT DOCUMENTS

| 5,500,923 A | * | 3/1996 | Kuroshima et al. ........ 358/1.15 |
| 5,757,965 A | | 5/1998 | Ohki |
| 5,936,223 A | | 8/1999 | Suzuki et al. |
| 6,094,510 A | | 7/2000 | Yaguchi et al. |
| 6,574,274 B2 | | 6/2003 | Obata et al. |
| 6,972,796 B2 | | 12/2005 | Katta et al. |

FOREIGN PATENT DOCUMENTS

| CN | 1235428 | 11/1999 |
| JP | 2001-016591 | 1/2001 |
| JP | 2001-309182 | 11/2001 |
| JP | 2004-120640 | 4/2004 |
| JP | 2005-159069 | 6/2004 |

\* cited by examiner

*Primary Examiner*—Phuoc Tran
(74) *Attorney, Agent, or Firm*—Fitzpatrick, Cella, Harper & Scinto

(57) ABSTRACT

An image forming apparatus having a reduction layout function has as its object to suppress any image degradation in recompressed image data. To achieve this object, an image processing method of this invention has the following arrangement. More specifically, an image processing method of generating reduced layout image data by using a plurality of image data as configured image data includes a step (step S1008) of decoding the plurality of configured image data which are compressed by using individual compression parameters, a step (step S1007) of extracting, on the basis of the compression parameters of the plurality of configured image data, a common compression parameter to compress the plurality of configured image data and assigning the common compression parameter, a step (step S1009) of recompressing the plurality of configured image data by using the assigned common compression parameter, and a step of compositing the plurality of recompressed configured image data as image data in a single page (step S1010) and outputting the image data (step S1012).

11 Claims, 11 Drawing Sheets

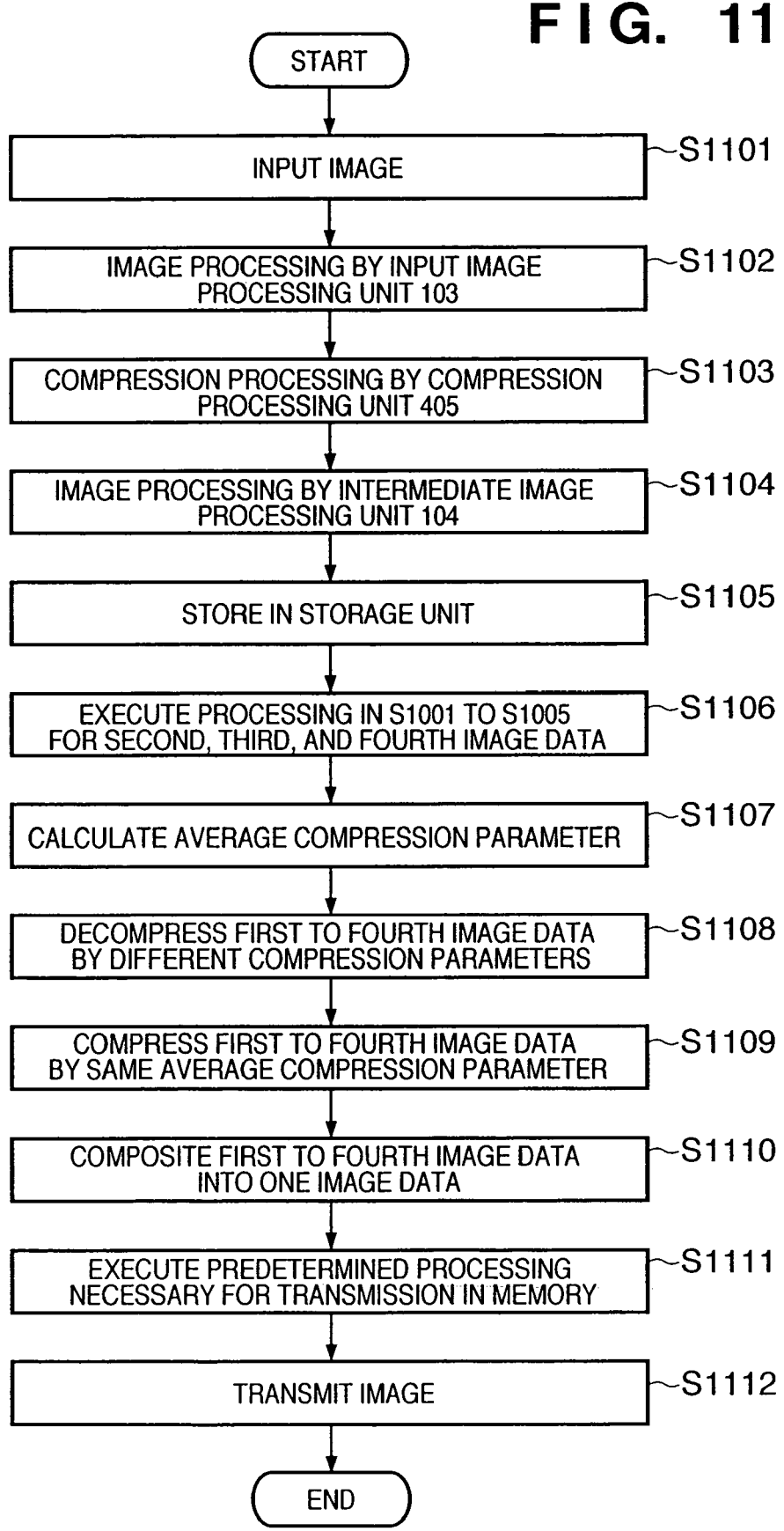

IMAGE PROCESSING APPARATUS, IMAGE PROCESSING METHOD, PROGRAM, AND STORAGE MEDIUM

FIELD OF THE INVENTION

The present invention relates to an image processing technique of generating image data by laying out a plurality of image data in a single page.

BACKGROUND OF THE INVENTION

Conventionally, a reduction layout print function is known as a function of a copying machine, which reads a plurality of documents, lays them out on one paper sheet, and prints them. According to this function, for example, four A4 documents can be read, reduced, laid out on one A4 paper sheet, and output (so-called 4-in-1).

In executing the reduction layout print function, the copying machine reduces a read A4 document to A6 and temporarily saves the reduced document in a storage device such as an internal memory. After the read of four A4 documents and reduction to A6 are completed, the four A6 documents saved in the memory are laid out on an A4 paper sheet and printed.

For example, a monochrome copying machine which reads and prints a document in monochrome requires a memory capacity of about 2 MB to implement 4-in-1 (when an A4 document is reduced to A6, the data amount per monochrome binary image data in A6 size for 400 dpi is about 500 KB, and the capacity is about 2 MB for four documents).

However, as the resolution and gray scale of color image data increase, the amount of image data processed by a color multifunction peripheral (to be referred to as an MFP hereinafter) is growing, and as a result, the necessary memory capacity is also increasing. For example, to implement the above-described 4-in-1 by storing four A6 documents in a memory, the data amount per color multilevel image data in A6 size for 600 dpi is about 25 KB, and the memory capacity must be about 100 MB for four documents. If such an MFP is to be implemented, the cost increases because of the use of the 100-MB memory. In addition, the image transfer rate and processing speed between processing modules in the MFP become low along with the increase in image data amount. As a result, the processing speed and performance of the device decrease.

To prevent this, a method is available in which read image data of each page is compressed and saved to decrease the memory capacity required for each document. For example, assume that the memory capacity assigned to each document is 1 MB. In this case, when each document image data is JPEG-compressed to 1 MB, the memory capacity can be decreased as indicated below.

TABLE 1

|  | Compression Information of Compression Parameter | Data Amount After Compression |
| --- | --- | --- |
| Document 1 | 1/25 | 1 MB |
| Document 2 | 1/30 | 1 MB |
| Document 3 | 1/20 | 1 MB |
| Document 4 | 1/10 | 1 MB |

The compression information of the compression parameter in Table 1 is based on document 1 (25 B). A 1/25 compression parameter indicates that document 1 (25 MB) can be compressed to 1 MB. A 1/10 compression parameter indicates that document 1 (25 MB) can be compressed to 2.5 MB. The amount of image data of document 4 (100 MB) can be compressed to 1 MB by using the 1/10 compression parameter. This indicates that document 4 contains frequency components less than document 1, i.e., document 4 contains a large amount of blank region. Hence, even when the 1/10 compression parameter as a low compression parameter is used as compared to document 1, document is compressed to 1 MB. That is, the 1/10 compression parameter indicates low compression (high image quality). The compression rate rises in the order of 1/20 compression parameter, 1/25 compression parameter, and 1/30 compression parameter. That is, the 1/30 compression parameter indicates highest compression (low image quality).

As described above, when compression is executed such that the data amount falls within the target memory capacity, the amount of high-resolution color image data can be reduced, and the problems of cost and performance can be solved. When compression is executed by changing the compression parameter for each image data such that the data amount falls within the target memory capacity, the degradation in image quality by compression can be minimized.

However, when a plurality of image data compressed by different compression parameters are to be laid out as image data of one page by 4-in-1 and printed, or the image data laid out are to be transmitted by using the Internet or a public line network, the plurality of image data compressed by different compression parameters must be compressed again (recompressed) as image data of one page by using one compression parameter.

The reasons are as follows. First, when the plurality of image data are to be recompressed by their compression parameters, eight different compression parameters must be prepared at maximum per page for 4-in-1 (Since images of four pages are laid out in one page, four different compression parameters are used. In addition, since one compression parameter includes a pair of parameters for luminance component and color difference component, four pages×two kinds=eight kinds of compression parameters are necessary at maximum). For 16-in-1, 32 different compression parameters must be prepared at maximum per page (Similarly, 32 kinds of compression parameters are necessary at maximum because each of 16 pages uses two kinds of compression parameters). In addition, a mechanism to compress and hold image data in each area by using the plurality of kinds of compression parameters must be prepared. This increases the load in MFP hardware design, and the cost of MFP inevitably rises.

Second, to transmit data by using the Internet or a public line network, transfer data between MFPs, or make MFPs cooperate, the image data receiving side must have a mechanism capable of decoding the plurality of kinds of different compression parameters. If such a mechanism is not present, received image data can be neither browsed nor printed, and the convenience for users is poor.

In the conventional MFP, when image data of one page is to be recompressed by using one compression parameter, a compression parameter for highest compression is selected from the compression parameters of the plurality of image data contained in the image data of one page. For this reason, the printed image data of one page contains considerably degraded image data.

SUMMARY OF THE INVENTION

The present invention has been made in consideration of the above-described problems, and has as its object to generate image data of one page compressed by using one compression parameter suitable for a purpose in image processing of decoding a plurality of image data each compressed by a different compression parameter and laying out the image data in a single page to generate image data of one page.

In order to achieve the above object, an image forming apparatus according to the present invention has the following arrangement. That is, an image processing apparatus for laying out a plurality of first image data in a single page to generate second image data, comprising:

decoding unit configured to decode the plurality of first image data which are compressed by using individual compression parameters;

extraction unit configured to extract, on the basis of the compression parameters of the plurality of first image data, a common compression parameter to compress the plurality of first image data and assigning the common compression parameter to the plurality of first image data;

recompression unit configured to recompress the plurality of first image data by using the common compression parameter assigned by the extraction unit; and output unit configured to composite the plurality of first image data recompressed by the recompression unit as second image data in the single page and outputting the second image data.

According to the present invention, in image processing of decoding a plurality of image data compressed by individual compression parameters and laying out the data in a single page to generate image data of one page, the generated image data is recompressed by using one compression parameter. With this arrangement, the convenience of image processing increases, and a desired image quality can be obtained as the image quality of the recompressed image data of one page.

Other features and advantages of the present invention will be apparent from the following description taken in conjunction with the accompanying drawings, in which like reference texts designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a flowchart for explaining the flow of processing of reading four A4 documents, laying them out on one A4 paper sheet, and transmitting the image data (Internet transmission or fax transmission).

DETAILED DESCRIPTION OF THE PREFERRED EMBODIMENTS

Preferred embodiments of the present invention will now be described in detail in accordance with the accompanying drawings.

In the following description, "compression parameter" indicates a quantization coefficient (includes both a quantization coefficient for encoding and a quantization coefficient for decoding) used to compress image data. "Compression information" indicates information to specify a compression parameter. For example, when a compression parameter is specified by a value representing the data amount ratio before and after compression, compression information is the value representing the data amount ratio before and after compression. When a compression parameter is specified by an identifier, compression information is the identifier (ID) to identify the compression parameter (quantization coefficient). In the following description, the identifier of a compression parameter is defined on the basis of the data amount ratio before and after compression.

First Embodiment

<Image Processing Arrangement of MFP 100>

Figure 1:
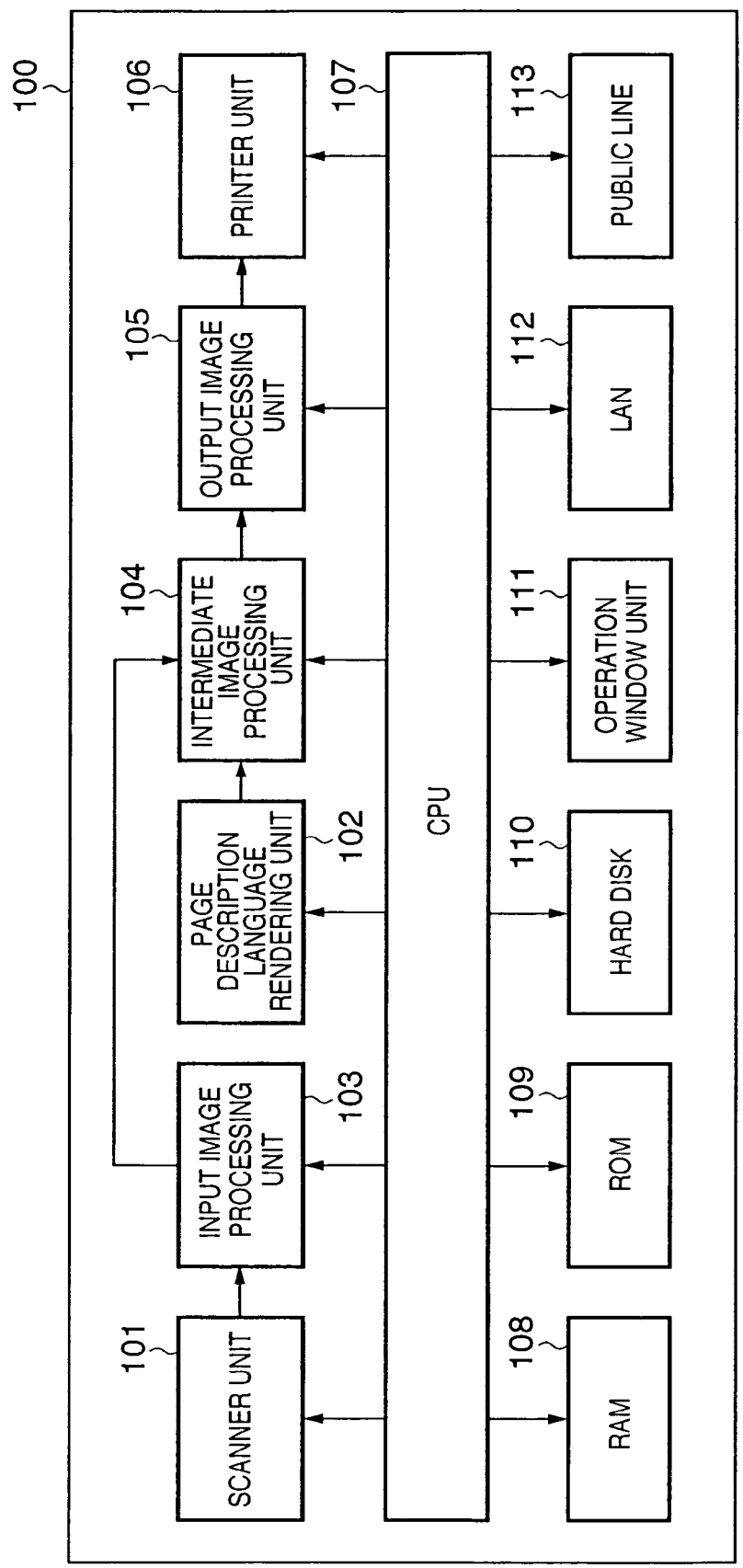
FIG. 1 is a block diagram showing the functional arrangement of an image forming apparatus (MFP 100) according to an embodiment of the present invention.

FIG. 1 is a block diagram showing the functional arrangement of an image forming apparatus (MFP) according to an embodiment of the present invention. As shown in FIG. 1, an MFP 100 has at least image input, storage, and output functions.

A scanner unit 101 reads a document image. A PDL (Page Description Language) rendering unit 102 inputs electronic data from a personal computer. Image data read by the scanner unit 101 is corrected by an input image processing unit 103 which executes predetermined image processing (image processing of the input system) (to be described later).

The image data corrected by the input image processing unit 103 or the image data input through the PDL rendering unit 102 undergoes predetermined image processing by an intermediate image processing unit 104 (to be described later). An output image processing unit 105 executes necessary correction processing for the image data processed by the intermediate image processing unit 104 to cause a printer unit 106 to output the image data.

The operations of the above-described processing units are controlled by a CPU 107. The functions of the processing units are implemented by using a RAM 108 and ROM 109 as a work memory for processing, an image data memory, or a program area.

A hard disk 110 is used to store/save image data or as a program area. An operation window unit 111 receives an operation instruction from the user in controlling the operation of the MFP 100. The operation window unit 111 comprises an image display unit to display the instruction contents, operation status, and preview of image data as well as an operation instruction unit which includes instruction keys and ten-key pad for input.

The image data processed in the MFP 100 can be output from the printer unit 106. Alternatively, the image data can be transmitted to another MFP, personal computer, PDA, cellular phone, or a device capable of browsing or handling an image through the Internet or intranet by using a LAN 112. In addition, the image data can be transmitted to a device capable of facsimile reception by using a public line 113.

The LAN 112 is an interface which can be connected to a network or connect discrete devices through wirelessly or by wire or infrared. The public line 113 is an interface which can be connected to a fixed telephone line or portable communication terminal wirelessly or by wire.

Although not illustrated in FIG. 1, the MFP 100 has a PCI bus slot or an external expansion interface such as a USB 2.0 or IEEE 1394. When a storage device such as a PC card, USB memory, or external hard disk is connected, image data can be transferred to the storage device.

<Sectional View of Mechanical Structure of MFP 100>

Figure 2:
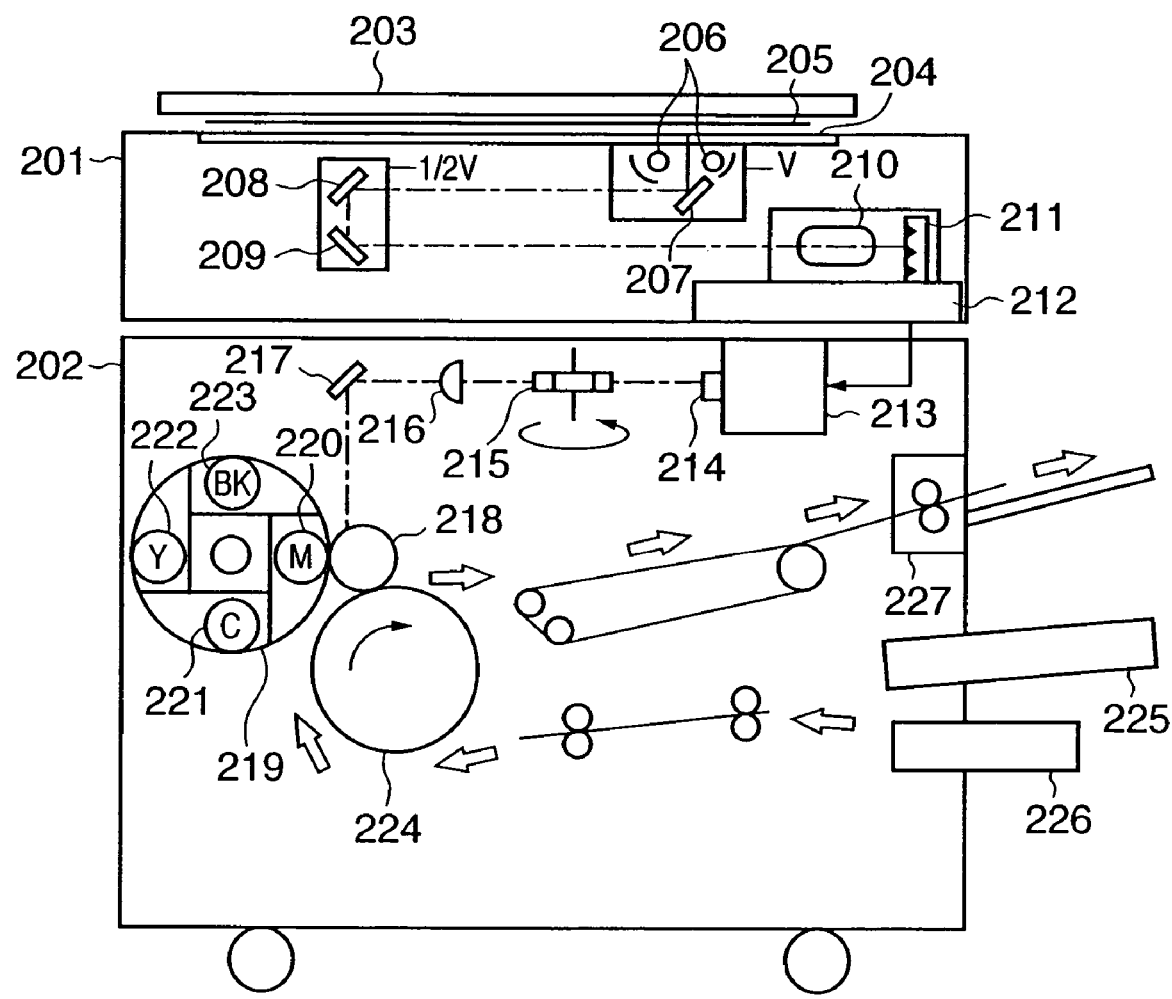
FIG. 2 is a sectional view showing the mechanical structure of the MFP 100 having image input, storage, and output functions.

FIG. 2 is a sectional view showing the mechanical structure of the MFP 100 having image input, storage, and output functions.

Referring to FIG. 2, an image scanner unit 201 reads a document and executes digital signal processing (corresponding to the scanner unit 101 in FIG. 1). A printer unit 202 prints and outputs a full-color image corresponding to the document image read by the image scanner unit 201 (corresponding to the printer unit 106 in FIG. 1).

The image scanner unit 201 includes a mirror platen 203, document glass table 204 (to be referred to as a platen hereinafter), lamp 206, mirrors 207 to 209, and lens 210. Light emitted from the lamp 206 is reflected by a document 205 on the platen 204. Reflected light is guided to the mirrors 207, 208, and 209. The reflected light forms an image on a 3-line solid-state image sensing element sensor (to be referred to as a CCD hereinafter) 211 via the lens 210 and sent to a signal processing unit 212 as three, red (R), green (G), and blue (B) image signals as full-color information. In a direction perpendicular to the electrical scanning (main scanning) direction of the line sensor, the lamp 206 and mirror 207 mechanically move at a velocity v, and the mirrors 208 and 209 move at a velocity ½ v to scan (sub-scan) the entire surface of the document. The document 205 is read at a resolution of 600 dpi (dots/inch) in both the main scanning and sub-scanning directions.

The signal processing unit 212 electrically processes the image signals generated by the CCD 211 to decompose them into magenta (M), cyan (C), yellow (Y), and black (Bk) components. The components are sent to the printer unit 202. One of the M, C, Y, and Bk components is sent to the printer unit 202 in one cycle of document scanning by the image scanner unit 201. One print output is completed by a total of four cycles of document scanning. The arrangement of the printer unit 202 will be described below.

The M, C, Y, and Bk image signals sent from the image scanner unit 201 are sent to a laser driver 213. The laser driver 213 modulates and drives a semiconductor laser 214 in accordance with the received image signals. A laser beam scans a photosensitive drum 208 through a polygon mirror 215, f-θ lens 216, and mirror 217. Like reading, writing is also done at a resolution of, e.g., 600 or 1,200 dpi in both the main scanning and sub-scanning directions.

A rotating developer device 219 includes a magenta developer unit 220, cyan developer unit 221, yellow developer unit 222, and black developer unit 223. The four developer units sequentially contact the photosensitive drum 218 and develop an electrostatic latent image formed on the photosensitive drum by toner.

A paper sheet supplied from a paper cassette 225 or 226 is wound around a transfer drum 224 so that the image developed on the photosensitive drum is transferred to the paper sheet. After the toners of the four colors (M, C, Y, and Bk) are sequentially transferred, the paper sheet passes through a fixing unit 227. The toners are fixed on the paper sheet. Then, the paper sheet is discharged.

<Arrangement of Input Image Processing Unit 103>

Figure 3:
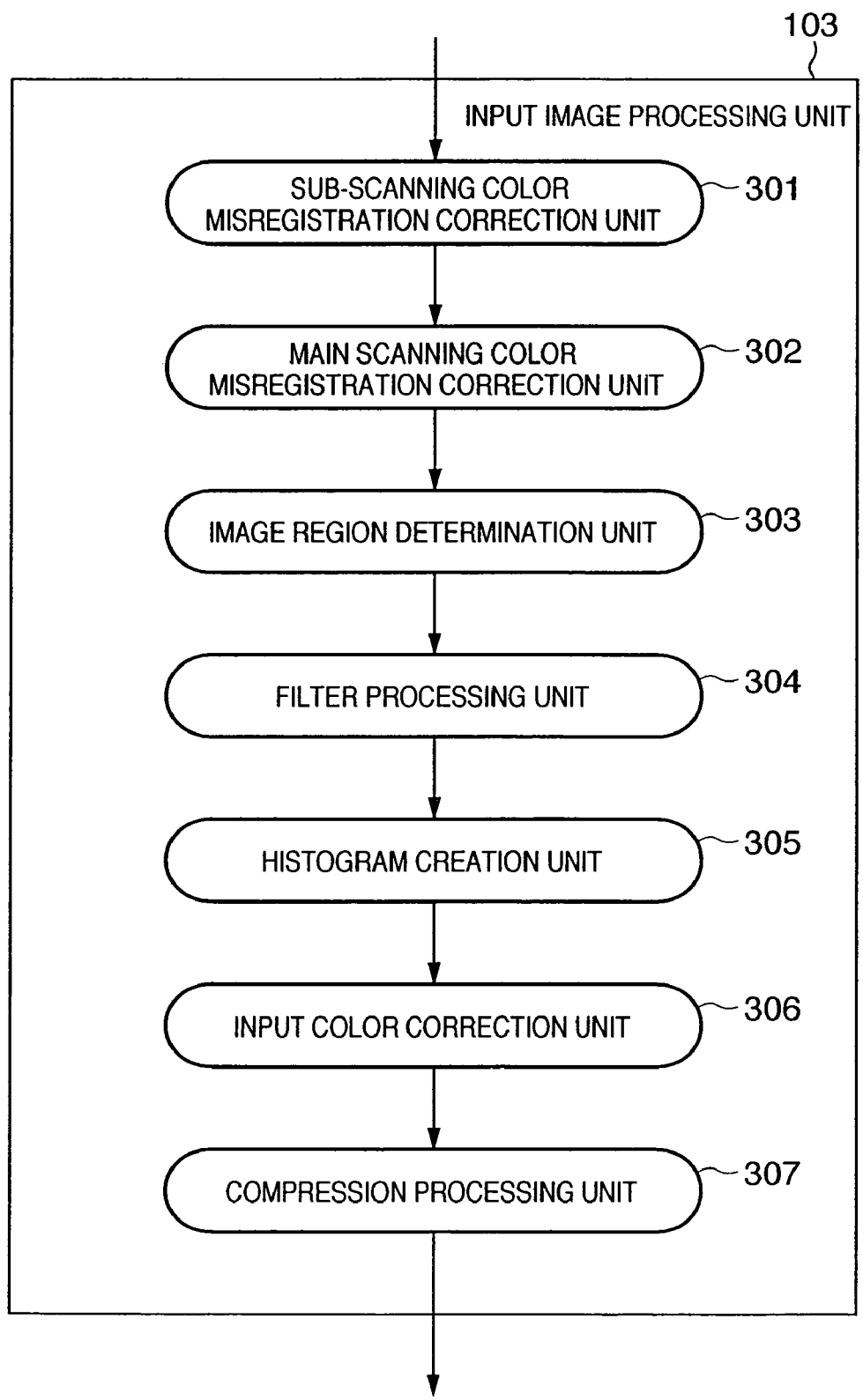
FIG. 3 is a block diagram showing the arrangement of an input image processing unit 103 of the MFP 100.

FIG. 3 is a block diagram showing the arrangement of the input image processing unit 103 of the MFP 100. Referring to FIG. 3, a sub-scanning color misregistration correction unit 301 corrects color misregistration of input image data in the sub-scanning direction. More specifically, the sub-scanning color misregistration correction unit 301 executes a 1×5 matrix operation for each color of the image data.

A main scanning color misregistration correction unit 302 corrects color misregistration of input image data in the main scanning direction. More specifically, the main scanning color misregistration correction unit 302 executes a 5×1 matrix operation for each color of the image data. An image region determination unit 303 identifies each image type in input image data. For example, an image type such as a photo/text portion or a chromatic/achromatic color portion contained in input image data is identified for each pixel, and attribute flag data representing the identified image type is generated for each pixel.

A filter processing unit 304 arbitrarily corrects the spatial frequency of input image data and executes, e.g., a 9×9 matrix operation. A histogram creation unit 305 samples the histogram of input image data. The histogram creation unit 305 determines whether input image data is color or monochrome or determines the undercolor level of input image data.

An input color correction unit 306 corrects the tint of input image data. The input color correction unit 306 executes correction processing for the tint of the input system by, e.g., converting the color space of input image data into an arbitrary color space.

Image data processed by the sub-scanning color misregistration correction unit 301 to input color correction unit 306 and attribute flag data generated by the image region determination unit 303 undergo predetermined compression processing by a compression processing unit 307 and transferred to the intermediate image processing unit 104 as compressed image data. In this compression processing, both image data and attribute flag data are compressed by a known compression technique. For example, for image data, JPEG compression is used to reduce the image data by applying lossy encoding. For attribute flag data, PackBits compression is used to prevent any loss in information by compression by applying lossless encoding.

In the description of FIG. 1, image data input through the PDL rendering unit 102 is input to the intermediate image processing unit 104 without passing through the input image processing unit 103. However, this embodiment is not particularly limited to this. Image data may be input to the intermediate image processing unit 104 after necessary processing is executed by the processing units (301 to 307) in the input image processing unit 103.

The arrangement in the input image processing unit 103 is not limited to the above-described processing units (301 to 307). Any other processing unit may be added. Some of the processing units shown in FIG. 3 may be omitted. The order of processing by the processing units is not particularly limited to the above-described order, either.

<Arrangement of Intermediate Image Processing Unit 104>

Figure 4:
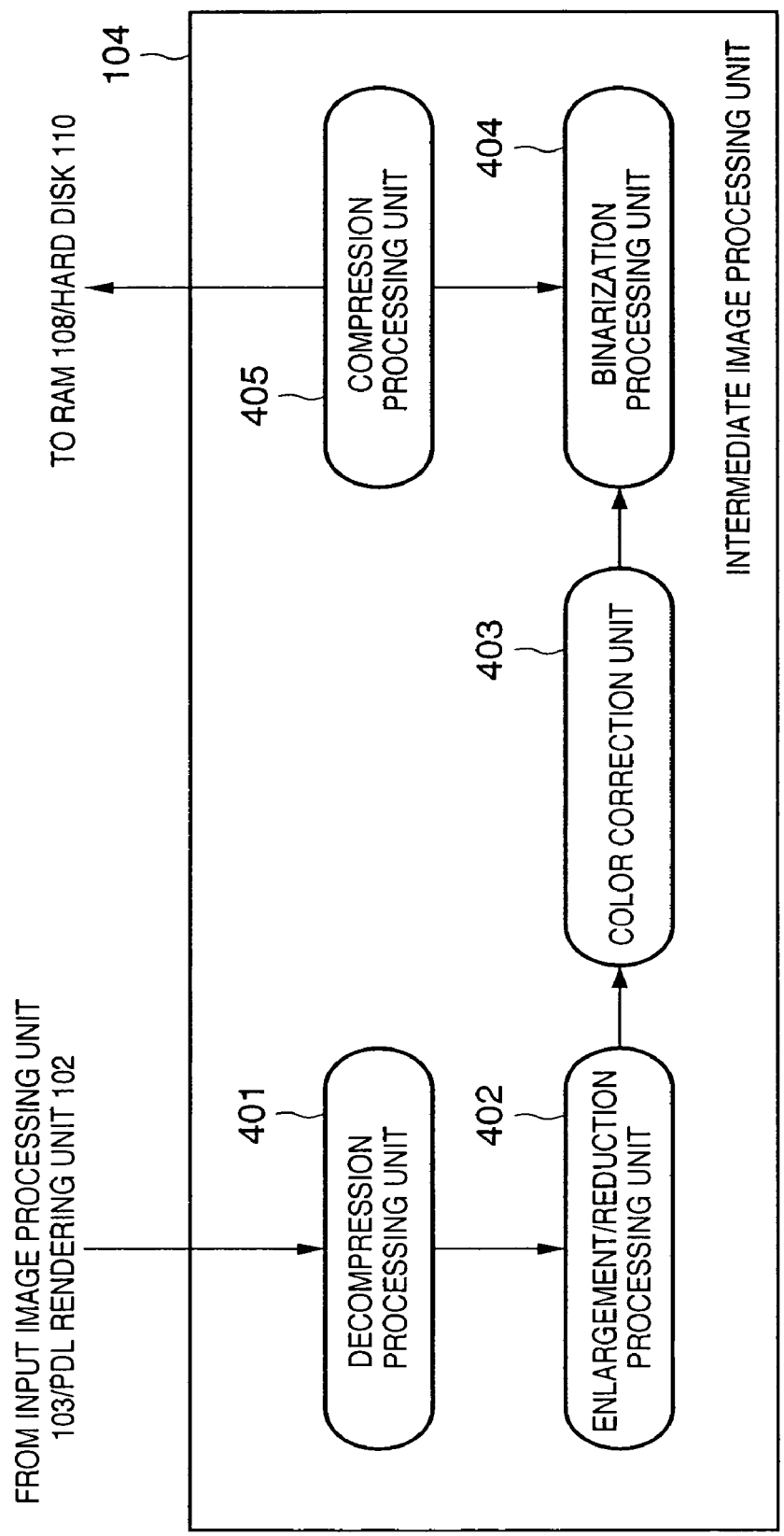
FIG. 4 is a block diagram showing the arrangement of an intermediate image processing unit 104 of the MFP 100.

FIG. 4 is a block diagram showing the arrangement of the intermediate image processing unit 104 of the MFP 100. Image data which has undergone processing by the input image processing unit 103 is transferred to the intermediate image processing unit 104 together with attribute flag data and undergoes the following processing.

A decoding (decompression) processing unit 401 decodes (decompresses) the image data and attribute flag data compressed by the predetermined compression methods. This will be described later in detail together with a description of a compression processing unit 405 with reference to FIGS. 6 and 7.

An enlargement/reduction processing unit 402 enlarges/reduces image data at a preset magnification on the operation window unit 111 described in FIG. 1. Enlargement/reduction is executed by using scaling by nearest neighbor processing in which substitution is executed by assigning the value of a neighboring pixel to a known pixel of interest, scaling by bilinear processing in which an interpolation value between a pixel of interest and a neighboring pixel is assigned, or scaling by bicubic processing in which function processing is executed for a neighboring pixel to assign the value.

A color correction unit 403 converts image data to be transmitted into a predetermined color space such as an sRGB color space before the image data is transmitted to another MFP, personal computer, PDA, cellular phone, or a device capable of browsing or handling an image through the LAN 112 described in FIG. 1. Alternatively, the color correction unit 403 converts color image data into monochrome image data before the image data is facsimile-transmitted by using the public line 113 described in FIG. 1.

A binarization processing unit 404 converts multilevel image data into binary image data before the image data is transmitted to another device as monochrome binary image data except facsimile transmission.

The compression processing unit 405 compresses image data and attribute flag data by predetermined compression methods. This will be described later in detail together with the above-described decoding (decompression) processing unit 401 with reference to FIGS. 6 and 7.

Image data from the input image processing unit 103 or compressed image data is decoded (decompressed) by the decoding (decompression) processing unit 401 and then subjected to a series of image processing by the processing units (402 to 405). Uncompressed image data from the PDL rendering unit 102 undergoes not decoding (decompression) processing by the decoding (decompression) processing unit 401 but only the series of image processing by the processing units (402 to 405). The arrangement of the intermediate image processing unit 104 is not limited to the above-described arrangement, like the input image processing unit 103.

Compressed image data processed by the intermediate image processing unit 104 is stored and saved in the RAM 108 and hard disk 110.

<Arrangement of Output Image Processing Unit 105>

Figure 5:
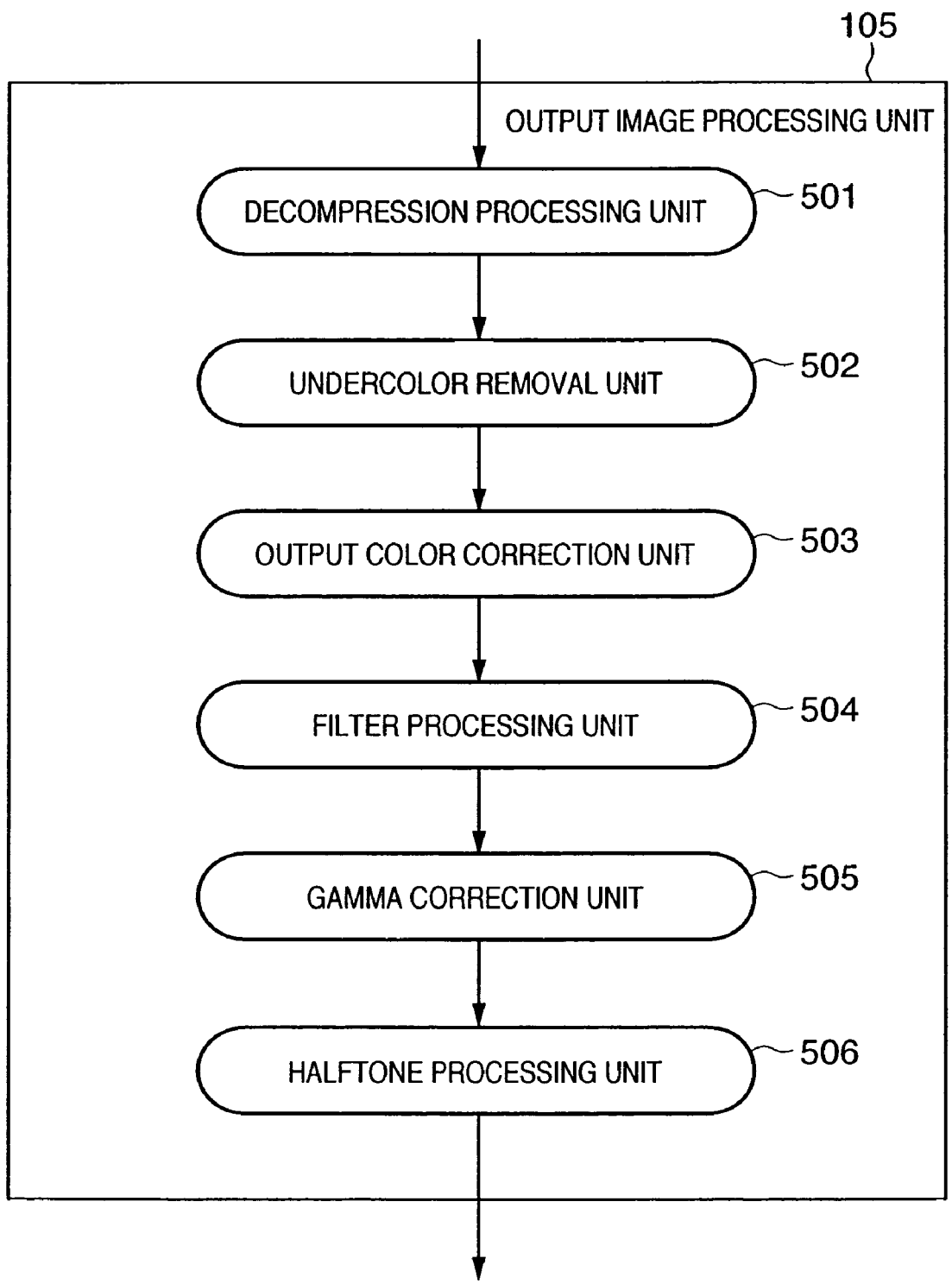
FIG. 5 is a block diagram showing the arrangement of an output image processing unit 105 of the MFP 100.

FIG. 5 is a block diagram showing the arrangement of the output image processing unit 105 of the MFP 100. A decoding (decompression) processing unit 501 decodes (decompresses) image data and attribute flag data compressed by predetermined compression methods.

An undercolor removal unit 502 removes the undercolor of image data and unnecessary undercolor overlap. The undercolor removal unit 502 removes the undercolor by, e.g., a 3×8 matrix operation or one-dimensional LUT.

An output color correction unit 503 executes color correction in accordance with the characteristic of the printer unit 202 which outputs image data. The output color correction unit 503 corrects the color of image data to be output by, e.g., a 4×8 matrix operation or direct mapping. A filter processing unit 504 arbitrarily corrects the spatial frequency of image data. The filter processing unit 504 executes, e.g., a 9×9 matrix operation for image data to be output.

A gamma correction unit 505 executes gamma correction in accordance with the characteristic of the printer unit 202 which outputs image data, and normally includes a one-dimensional LUT. A halftone processing unit 506 executes arbitrary halftone processing in accordance with the number of gray levels of the printer unit 202 which outputs image data. The halftone processing unit 506 executes arbitrary screen processing or error diffusion processing such as binarization or hexadecimal processing. Image data processed by the output image processing unit 105 is subjected to image output processing by the printer unit 106.

The arrangement of the output image processing unit 105 is not limited to the above-described arrangement, like the input image processing unit 103.

The input image processing unit 103, intermediate image processing unit 104, and output image processing unit 105 have been described with reference to FIGS. 3, 4, and 5. The image processing units (only processing units after the image region determination unit 303) receive attribute flag data generated by the image region determination unit 303 in FIG. 3 together with, image data and execute image processing in accordance with the attribute flag data by using a processing coefficient optimum for each image region. This also applies when attribute flag data is input from the PDL rendering unit 102 together with image data.

For example, the filter processing unit 504 of the output image processing unit 105 executes processing by enhancing the high-frequency component of image data with respect to a text region to emphasize the sharpness of the texts or by executing so-called low-pass filter for a halftone region to remove a moire component unique to a digital image. When each processing unit executes optimum processing based on the attribute flag data, a high image quality can be implemented.

<Arrangement of Compression Processing Units 307 and 305>

Figure 6:
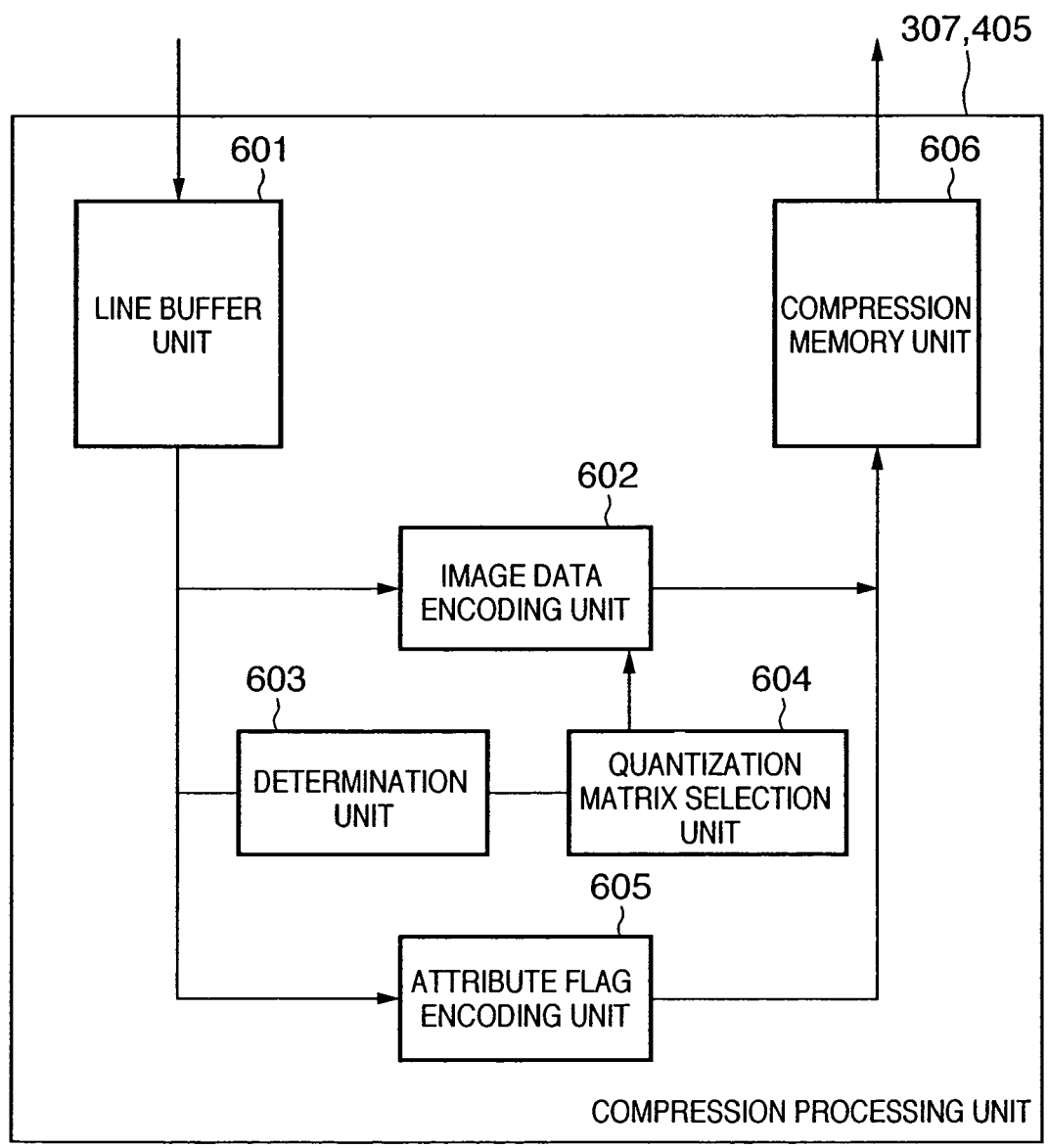
FIG. 6 is a block diagram showing the arrangement of a compression processing unit 307 of the input image processing unit 103 and a compression processing unit 405 of the intermediate image processing unit 104 of the MFP 100.

FIG. 6 is a block diagram showing the arrangement of the compression processing unit 307 of the input image processing unit 103 and the compression processing unit 405 of the intermediate image processing unit 104 of the MFP 100.

A line buffer unit 601 buffers received image data and attribute flag data for each line and divides accumulated data of a predetermined number of lines into tile-shaped data (tile data) containing M×N pixels. For, e.g., 8×8 (M=8 and N=8), when image data of 8 lines is accumulated, the data is output from the printer unit 106 as tile data containing 8×8 pixels.

The image data is subjected to discrete cosine transform encoding (JPEG) by an image data encoding unit 602 for each packet, i.e., each tile data of M×N pixels. The attribute flag data is subjected to run-length encoding by an attribute flag encoding unit 605 for each packet.

Note that M and N must be a multiple of the window size for discrete cosine transform encoding. In this embodiment, JPEG compression is used. In JPEG compression, the window size for compression is 8×8 pixels. If, e.g., M=N=32, tile data of 32×32 pixels is further divided into 16 tile data of 8×8 pixels, and JPEG compression is executed for each data of 8×8 pixels (the following description will be done assuming M=N=32, although the present invention is not limited to this value).

The image data encoding unit 602 executes known DCT transform for 16 8×8 pixel window contained in tile data of 32×32 pixels to quantize the image data. The quantization coefficient (also called a quantization matrix) used at this time can be selectively set for each tile. Switching is done in the following way. A determination unit 603 refers to attribute flag data of 32×32 pixels corresponding to predetermined image data (one tile data) of 32×32 pixels. For example, when the attribute flag data of 32×32 pixels include even one pixel of attribute flag data representing a text, image data (one tile data) formed from the 32×32 pixels is regarded as a text tile. An instruction is issued to a quantization matrix selection unit 604 to compress the image data (one tile data) by using a quantization coefficient for text. If no pixel of attribute representing a text is included, the image data (one tile data) is regarded as a photo tile. An instruction is issued to the quantization matrix selection unit 604 to compress the image data (one tile data) by using a quantization coefficient for photo. The quantization matrix selection unit 604 selects a predetermined quantization coefficient, sets it in the image data encoding unit 602, and compresses image data by using a different quantization coefficient for each tile.

The encoded image data and attribute flag data are transferred to subsequent processing units as compressed image data and compressed attribute flag data through a compression memory unit 606.

<Arrangement of Decoding (Decompression) Processing Units 401 and 501>

Figure 7:
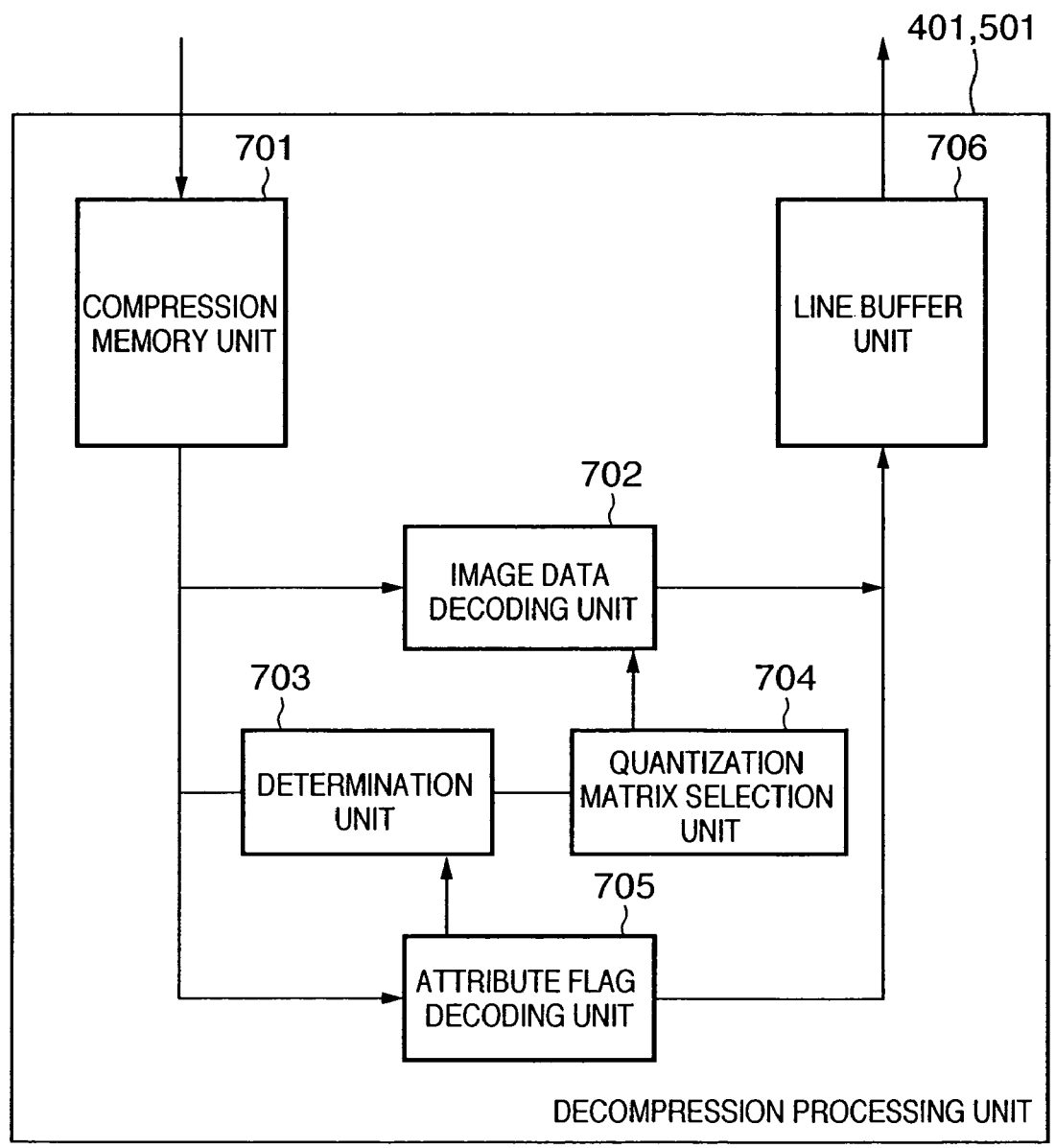
FIG. 7 is a block diagram showing the arrangement of a decoding (decompression) processing unit 401 of the intermediate image processing unit 104 and a decoding (decompression) processing unit 501 of the output image processing unit 105 of the MFP 100.

FIG. 7 is a block diagram showing the arrangement of the decoding (decompression) processing unit 401 of the intermediate image processing unit 104 and the decoding (decompression) processing unit 501 of the output image processing unit 105 of the MFP 100.

To decode (decompress) compressed image data, the compressed image data and compressed attribute flag data are read out and decoded (decompressed) in accordance with the following procedures.

First, compressed image data and attribute flag data are extracted to a compression memory unit 701. Tile data of M×N pixels of the attribute flag data is decoded (decompressed) by an attribute flag decoding (decompression) unit 705.

On the basis of the decoding (decompression) result of the attribute flag data, a determination unit 703 executes attribute determination processing. More specifically, as described above, it is determined on the basis of the attribute flag data whether each image data (one tile data) is a text tile or photo tile. An instruction is sent to a quantization matrix selection unit 704 to select a decoding coefficient for each tile. The quantization matrix selection unit 704 selects the decoding coefficient to be used for each tile and sends it to an image data decoding (decompression) unit 702. The image data decoding (decompression) unit 702 decodes (decompresses) image data by selectively using the decoding coefficient for each tile and outputs the data to a line buffer unit 706.

The determination unit 603 in FIG. 6 and the determination unit 703 in FIG. 7 execute the same determination. The attribute flag data is compressed by lossless compression such as run-length encoding without any data degradation. Hence, for the same tile data, the same determination result is obtained in encoding and decoding (decompression). Even when tiles are quantized by using different quantization coefficients, a decoding coefficient suitable for each tile is set at the time of decoding (decompression). Hence, correct decoded (decompressed) image data can be obtained.

The image data encoding unit 602 in FIG. 6 and the image data decoding (decompression) unit 702 in FIG. 7 will be described in detail with reference to FIG. 8. The attribute flag encoding unit 605 in FIG. 6 will be described in detail with reference to FIG. 9.

<Arrangement of Image Data Encoding Unit and Image Data Decoding (Decompression) Unit>

Figure 8:
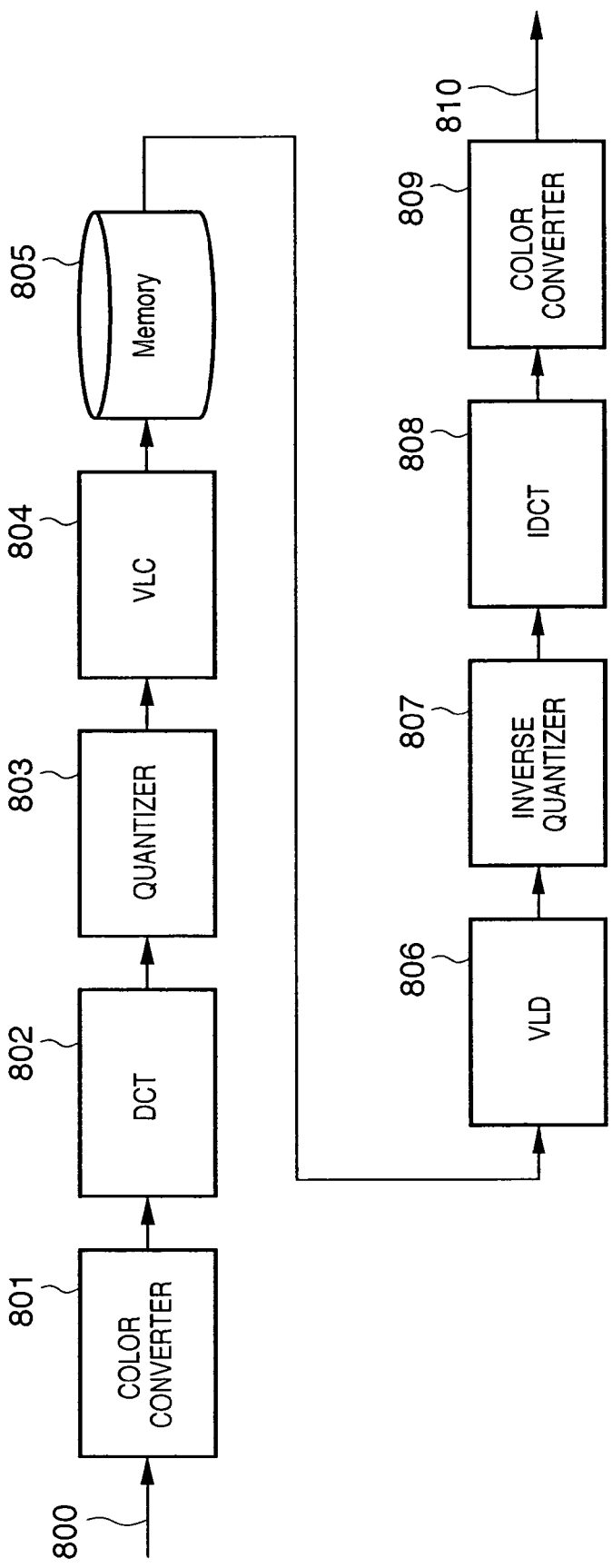
FIG. 8 is a block diagram of an image data encoding unit 602 and an image data decoding (decompression) unit 702 in FIG. 7.

FIG. 8 is a block diagram of the image data encoding unit 602 in FIG. 6 and the image data decoding (decompression) unit 702 in FIG. 7.

Referring to FIG. 8, reference numeral 800 denotes an input image data signal. As a color signal, three color image data signals of red (R), green (G) and blue (B) are input. A color converter 801 converts the R, G, and B signals into luminance/color difference signals (Y, Cb, and Cr). A discrete cosine transformer (CDT) 802 executes spatial frequency conversion (DCT transform) for every 8×8 pixels of the luminance/color difference signals. A quantizer 803 quantizes a DCT coefficient by using a set quantization matrix to reduce the data amount. A variable length coding device 804 Huffman-encodes the quantization value to further reduce the data amount. The detailed arrangement of the image data encoding unit 602 has been described above. Compressed image data is stored in a compression memory 805. The compression memory 805 corresponds to the compression memory unit 606 shown in FIG. 6 and the compression memory unit 701 shown in FIG. 7.

Details of the image data decoding (decompression) unit 702 will be described next. Image data stored in the compression memory 805 is decoded (decompressed) in accordance with the following procedures.

A variable length decoding (decompression) device 806 executes Huffman decoding. An inverse quantizer 807 returns the data to a DCT coefficient value by using a set inverse quantization matrix. An IDCT 808 executes inverse DCT transform to return the data to luminance/color difference signals. A color converter 809 returns the luminance/color difference signals to R, G, and B signals. Reference numeral 810 denotes a color image signal output to the outside as a result of above-described compression and decoding (decompression) processing.

<Arrangement of Attribute Flag Encoding Unit>

Figure 9:
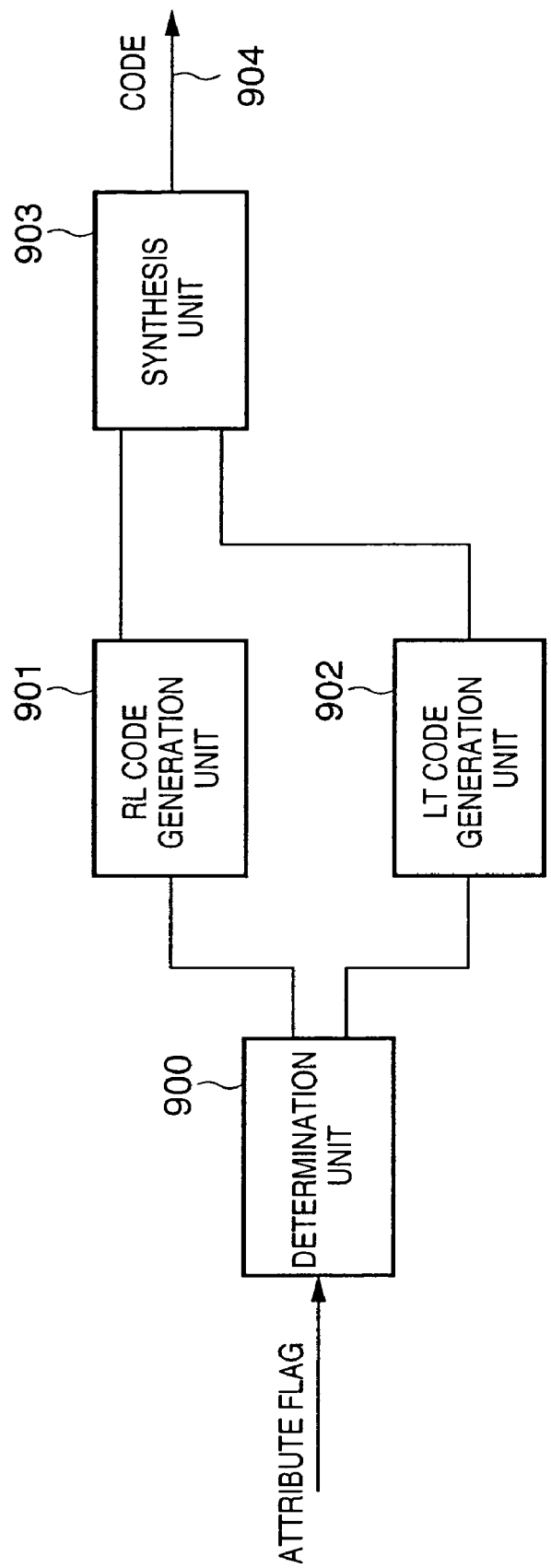
FIG. 9 is a block diagram showing the arrangement of an attribute flag encoding unit 605 serving as a run-length encoder of attribute flag data.

FIG. 9 is a block diagram showing the arrangement of the above-described attribute flag encoding unit 605 serving as a run-length encoder of attribute flag data.

Referring to FIG. 9, a determination unit 900 determines whether the value of a preceding pixel of received attribute flag data equals the value of the current pixel. If the values equal, the path is switched to send the attribute flag data to an RL code generation unit 901. If the values do not equal, the path is switched to send the attribute flag data to an LT code generation unit 902.

The RL code generation unit 901 counts the number of cases wherein the current pixel value equals the preceding pixel value until a different value is detected, and outputs the repeat value finally.

The LT code generation unit 902 counts the number of cases wherein the current pixel value is different from the preceding pixel value and outputs a code word corresponding to the counted number and the least bit number of the actual value in number equal to the counted number.

A synthesis unit 903 synthesizes the output data from the RL code generation unit 901 and that from the LT code generation unit 902 and outputs a code 904.

<Description of Flow of 4-In-1 Print>

Figure 10:
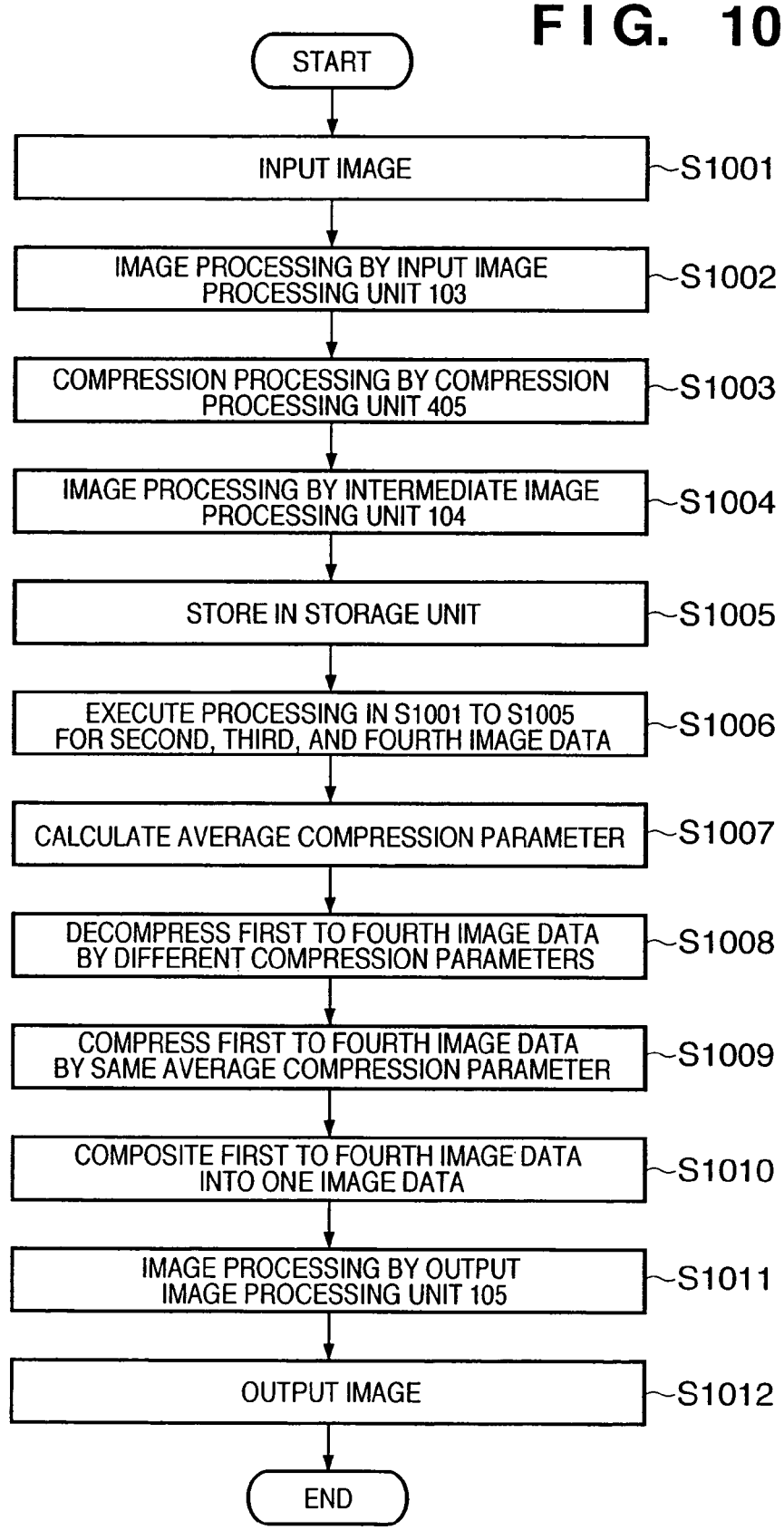
FIG. 10 is a flowchart for explaining the flow of processing of reading four A4 documents, laying them out on one A4 paper sheet, and outputting the image data.

FIG. 10 is a flowchart for explaining the flow of processing of reading four A4 documents, laying them out on one A4 paper sheet, and outputting the image data. More specifically, the flow of processing of reducing each A4 document to A6, laying out the documents on one A4 paper sheet, and printing and outputting the image data will be described.

The first A4 image data input by the scanner unit 101 in step S1001 is subjected to various kinds of image processing by the input image processing unit 103 in step S1002.

In step S1003, the compression processing unit 307 of the input image processing unit 103 compresses the received A4 image data by using an optimum compression parameter so that the data is reduced to a predetermined data amount. In this case, A4 RGB color image data of 600 dpi (data amount: 100 MB) is compressed to 10 MB. That is, as the first image data, 100-MB image data is compressed to 10 MB by using the 1/10 compression parameter.

In step S1004, image processing by the intermediate image processing unit 104 is executed. More specifically, the decoding (decompression) processing unit 401 executes decoding (decompression) processing, and the enlargement/reduction processing unit 402 reduces A4 to A6. The color correction unit 403 and binarization processing unit 404 execute no processing in this case. The image data is compressed again by the compression processing unit 405 by using the 1/10 compression parameter.

In step S1005, the image data compressed by the compression processing unit 405 is stored and saved in the RAM 108 and hard disk 110. The A6 compressed image data stored here has a data amount of about 2.5 MB because the data amount of the A4 compressed image data is 10 MB.

In step S1006, second, third, and fourth A4 documents are read sequentially, and the same processing as in the above-described input image processing unit 103 and intermediate image processing unit 104 is executed. Each of the first, second, third, and fourth 100-MB image data is compressed to 10 MB and then to about 2.5 MB by reduced the size to A6 and stored and saved in the RAM 108 and hard disk 110.

In this embodiment, for example, the first image data is compressed by using the 1/10 compression parameter. The second image data is compressed by using the 1/20 compression parameter. The third image data is compressed by using the 1/30 compression parameter. The fourth image data is compressed by using the 1/40 compression parameter.

The 1/10 compression parameter here is prepared as a quantization coefficient capable of compressing A4 image data (100 MB) having a predetermined "pattern" to 10 MB, i.e., 1/10 image size capacity. Any input image having the same frequency characteristic as that of the predetermined A4 (100 MB) document can be compressed to 10 MB. On the other hand, an input image having a higher frequency component than the predetermined A4 (100 MB) document cannot effectively be compressed by the 1/10 compression parameter. Hence, the data amount can be reduced to not 10 MB but, e.g., 20 MB at the utmost.

Similarly, the 1/20 compression parameter is a quantization coefficient capable of compressing the above-described predetermined A4 (100 MB) document to 5.0 MB. The 1/30 compression parameter is a quantization coefficient capable of compressing the document to 3.3 MB. The 1/40 compression parameter is a quantization coefficient capable of compressing the document to 2.5 MB.

On the basis of the above description, the above-described first, second, third, and fourth input document images have different frequency characteristics. The first document image has the same frequency component as the above-described predetermined A4 (100 MB) document and therefore can be compressed to 10 MB by using the 1/10 compression parameter. However, the second input document image has a higher frequency component. Hence, with the 1/10 compression parameter, no sufficient compression effect can be obtained, and the image data is compressed to, e.g., 20 MB. To reduce the amount to 10 MB, the 1/20 compression parameter for higher compression is used. The third input document image has a higher frequency component, and its data amount is reduced to 10 MB by using the 1/30 compression parameter for higher compression. The amount of the fourth input document image is reduced to 10 MB by using the 1/40 compression parameter.

In step S1007, to reassign the compression parameter to put the four image data compressed by different compression parameters together into one image data, the average value of the compression information of the four different compression parameters is calculated.

In step S1008, to assign one compression parameter, the four image data stored and saved in the RAM 108 and hard disk 110 are sent to the intermediate image processing unit 104 sequentially and decoded (decompressed) by the decoding (decompression) processing unit 401 by using the 1/10, 1/20, 1/30, and 1/40 compression parameters.

In step S1009, a compression parameter corresponding to the compression information average value calculated in step S1007 is assigned to the four image data to recompress them. In this embodiment, 1/25 is calculated as the average value of the compression information (1/10, 1/20, 1/30, and 1/40) of the 1/10, 1/20, 1/30, and 1/40 compression parameters. Hence, the compression processing unit 405 recompresses the four image data by assigning the 1/25 compression parameter.

The 1/10 compression parameter for lowest compression in the four images may be assigned to the four images as one compression parameter. Alternatively, the 1/40 compression parameter for highest compression in the four images may be assigned to the four images as one compression parameter. In the former case, the images are recompressed by using the quantization coefficient of low compression, i.e., the 1/10 compression parameter although the 1/20, 1/30, and 1/40 compression parameters for compression higher than the 1/10 compression parameter are used to compress the second, third, and fourth image data. Hence, although the image quality becomes high, the total data amount can increase (however, since the image data have already undergone high compression, the data amount is unlikely to increase very largely). In the latter case, the images are recompressed by using the quantization coefficient of high compression, i.e., the 1/40 compression parameter although the 1/10, 1/20, and 1/30 compression parameters for compression lower than the 1/40 compression parameter are used to compress the first, second, and third fourth image data. Hence, although the data amount can be reduced, the total image quality becomes poor.

In this embodiment, the average value of compression information of the four different compression parameters is calculated, and a compression parameter corresponding to the calculated compression information is applied. In this case, the image data can be recompressed by using the compression parameter at the middle level between low compression and high compression. Hence, any large degradation in image and any increase in image capacity can be prevented, and a high image quality can be maintained.

In step S1010, the four A6 images are composited into one A4 image data on the RAM 108. If the amount of one A4 data exceeds the predetermined data amount of 10 MB, the data may be compressed again by using a compression parameter of higher level to reduce the data amount to 10 MB. Alternatively, even when the data amount exceeds 10 MB, the data may be recompressed.

In step S1011, the compressed image data stored and saved in the hard disk 110 is sent to the output image processing unit 105 and undergoes predetermined image processing. In step S1012, the compressed image data is printed and output by the printer unit 106.

<Description of Flow of 4-In-1 Transmission>

FIG. 11 is a flowchart for explaining the flow of processing of reading four A4 documents, laying them out on one A4 paper sheet, and transmitting the image data (Internet transmission or fax transmission). More specifically, the flow of processing of reducing each A4 document to A6, laying out the documents on one A4 paper sheet, and transmitting the image data will be described.

The first A4 image data input by the scanner unit 101 in step S1101 is subjected to various kinds of image processing by the input image processing unit 103 in step S1102. In step S1103, the compression processing unit 307 of the input image processing unit 103 compresses the received A4 image data by using an optimum compression parameter so that the data is reduced to a predetermined data amount. In this case, A4 RGB color image data of 600 dpi (data amount: 100 MB) is compressed to 10 MB. That is, as the first image data, 100-MB image data is compressed to 10 MB by using the 1/10 compression parameter.

In step S1104, image processing by the intermediate image processing unit 104 is executed. More specifically, the decoding (decompression) processing unit 401 executes decoding (decompression) processing, and the enlargement/reduction processing unit 402 reduces A4 to A6. If resolution conversion is necessary for transmission, the resolution is converted here. The color correction unit 403 executes various kinds of conversion processing (the data is converted into the sRGB color space for Internet transmission, or color image data is converted into monochrome image data for fax transmission). For fax transmission, the binarization processing unit 404 also binarizes the monochrome image data to convert the data into image data suitable for fax transmission. The converted image data is compressed again by the compression processing unit 405 by using the 1/10 compression parameter.

In step S1105, the image data compressed in step S1104 is stored and saved in the RAM 108 and hard disk 110. If the A6 compressed image data stored here is color image data, it has a data amount of about 2.5 MB because the data amount of the A4 compressed image data is 10 MB. For monochrome image data, the data amount is about 0.1 MB (however, the data amount changes if the resolution is converted from 600 dpi to, e.g., 300 dpi for transmission).

In step S1106, second, third, and fourth A4 documents are read sequentially, and the same processing as in the above-described input image processing unit 103 and intermediate image processing unit 104 is executed. Each 100-MB image data is compressed to 10 MB and stored and saved in the RAM 108 and hard disk 110. In this embodiment, the first image data is compressed by using the 1/10 compression parameter. The second image data is compressed by using the 1/20 compression parameter. The third image data is compressed by using the 1/30 compression parameter. The fourth image data is compressed by using the 1/40 compression parameter.

In step S1107, to reassign the compression parameter to put the four image data compressed by different compression parameters together into one image data, the average value of the compression information of the four different compression parameters is calculated.

In step S1108, the four image data stored and saved in the RAM 108 and hard disk 110 are sent to the intermediate image processing unit 104 sequentially and decoded (decompressed) by the decoding (decompression) processing unit 401 by using the 1/10, 1/20, 1/30, and 1/40 compression parameters.

In step S1109, a compression parameter corresponding to the compression information average value calculated in step S1107 is assigned to the four image data. In this embodiment, 1/25 is calculated as the average value of the compression information (1/10, 1/20, 1/30, and 1/400) of the 1/10, 1/20, 1/30, and 1/40 compression parameters. Hence, the 1/25 compression parameter is assigned to the four image data. The compression processing unit 405 recompresses the four image data by using the 1/25 compression parameter. In step S1110, the four A6 images are composited into one A4 image data on the RAM 108. If the amount of one A4 data exceeds the predetermined data amount of 10 MB, the data may be compressed again by using a compression parameter of higher level to reduce the data amount to 10 MB. Alternatively, even when the data amount exceeds 10 MB, the data may be recompressed.

In step S1111, a header and the like necessary for transmission are added, on the RAM 108, to the compressed image data stored and held in the hard disk 110. In step S1112, the compressed image data is transmitted by using the LAN 112 or public line 113.

As is apparent from the above description, according to this embodiment, in an image forming apparatus (MFP) which decompresses a plurality of image data compressed by predetermined compression parameters and lays them out in a single page to generate image data, the generated image data is recompressed by using one compression parameter before the image data is recompressed and output (printed or transmitted). With this arrangement, the cost of the image forming apparatus can be reduced, and the convenience can be increased.

According to this embodiment, as one compression parameter used for recompression, a compression parameter at the middle level between low compression and high compression (a compression parameter corresponding to the average value of compression information of the compression parameters of the plurality of image data contained in the generated image data) is used. Hence, any large degradation in image and any increase in image capacity can be prevented, and a high image quality can be maintained.

Second Embodiment

In the first embodiment, to recompress generated image data, an average value calculated on the basis of a value representing the data amount ratio before and after compression such as the 1/10, 1/20, 1/30, and 1/40 compression parameter is used. However, the present invention is not limited to this. A compression parameter may be extracted by, e.g., the following extraction method.

Method of Registering Compression Parameter as ID and Calculating Compression Parameter by Using ID The ID of each compression parameter is defined on the basis of the data amount ratio before and after compression, as in equation (1). The average value of ID values is calculated by equation (2). A compression parameter given by equation (3) is used.

$$ID(1)=1/10, ID(2)=1/20,$$

$$ID(3)=1/30, ID(4)=1/40 \qquad (1)$$

$$(1+2+3+4) \div 4 = 2.5 \qquad (2)$$

$$ID(2.5)=1/25 \qquad (3)$$

The 1/25 compression parameter may be calculated from ID(2) and ID(3). Alternatively, a rule that either ID(2) or ID(3), and for example, a lower compression coefficient is assigned for a fraction may be determined in advance, and ID(2) may be selected.

Method of Obtaining Compression Parameter Directly from Threshold Value of Compression Parameter An actual JPEG compression parameter (quantization matrix) is formed from an 8×8 matrix. As an example of the matrix value, two matrix values (example 1 and example 2) are shown below.

Example 1)

| 4  | 9  | 9  | 13 | 20 | 33 | 41 | 49 |
|----|----|----|----|----|----|----|----|
| 10 | 10 | 12 | 16 | 21 | 47 | 49 | 45 |
| 12 | 11 | 13 | 20 | 33 | 46 | 56 | 45 |
| 12 | 14 | 18 | 24 | 41 | 70 | 65 | 50 |
| 15 | 18 | 30 | 45 | 55 | 88 | 83 | 62 |
| 20 | 29 | 45 | 52 | 65 | 84 | 91 | 74 |
| 40 | 52 | 63 | 70 | 83 | 97 | 97 | 81 |
| 58 | 74 | 77 | 79 | 90 | 89 | 83 | 80 |

Example 2)

| 4  | 15 | 20 | 38 | 80 | 80 | 80 | 80 |
|----|----|----|----|----|----|----|----|
| 15 | 17 | 21 | 53 | 80 | 80 | 80 | 80 |
| 20 | 21 | 45 | 80 | 80 | 80 | 80 | 80 |
| 38 | 53 | 80 | 80 | 80 | 80 | 80 | 80 |
| 80 | 80 | 80 | 80 | 80 | 80 | 80 | 80 |
| 80 | 80 | 80 | 80 | 80 | 80 | 80 | 80 |
| 80 | 80 | 80 | 80 | 80 | 80 | 80 | 80 |
| 80 | 80 | 80 | 80 | 80 | 80 | 80 | 80 |

In obtaining an average from a plurality of different compression parameter, the average value of matrix values may be calculated as the threshold value of the matrix value and used as an average matrix value. In the above examples, the average value of the matrices of example 1 and example 2 is as follows.

| 4  | 12 | 15 | 26 | 50 | 57 | 61 | 65 |
|----|----|----|----|----|----|----|----|
| 13 | 14 | 17 | 35 | 51 | 64 | 65 | 63 |
| 16 | 16 | 29 | 50 | 57 | 63 | 68 | 63 |
| 25 | 34 | 49 | 52 | 61 | 75 | 73 | 65 |
| 48 | 49 | 55 | 63 | 68 | 84 | 82 | 71 |
| 50 | 55 | 63 | 66 | 73 | 82 | 86 | 77 |
| 60 | 66 | 72 | 75 | 82 | 89 | 89 | 81 |
| 69 | 77 | 79 | 80 | 85 | 85 | 82 | 80 |

In this example, an average value is calculated from two compression parameters. In this way, an average value may be calculated from a plurality of compression parameters.

Method of obtaining compression parameter from Q value

When a compression coefficient is designated as Q=90, 80, 70, 60, the compression parameter may be calculated from the Q value (the larger the Q value becomes, the lower the compression becomes). For example, when the compression coefficient is designated as Q=90, 80, 70, 60, the average value of the four Q values, i.e., 75 is set as the Q value, and a compression coefficient corresponding to Q=75 is applied.

Third Embodiment

In the first embodiment, in 4-in-1, the average value of compression information of four compression parameters is calculated as one compression parameter and reassigned to four image data. However, the present invention is not limited to this. For example, instead of the average value of compression information of four compression parameters, the average value of compression information of compression parameters except the compression parameter for lowest compression and that for highest compression may be calculated. Alternatively, the compression parameter may be calculated by multiplying the compression information of an arbitrary compression parameter by a predetermined weighting coefficient.

Fourth Embodiment

In the first embodiment, in 4-in-1, a compression parameter corresponding to the average value of compression information of four compression parameters is extracted as one compression parameter and reassigned to four image data. However, the present invention is not limited to this. For example, a user interface capable of arbitrary switching among modes described below is provided in an operation window unit 111. By arbitrarily switching the mode, an optimum compression parameter suitable for user's desire may be assigned.

The operation window unit 111 of the MFP according to this embodiment has three mode selection keys "size priority", "automatic", and "image quality priority". Each mode has the following function.

Size Priority Mode

A compression parameter for highest compression is selected from image data of a plurality of pages as a quantization coefficient to be assigned. With this processing, the total data amount can be reduced.

Automatic Mode

The average value of compression information of image data of a plurality of pages is calculated. A compression parameter corresponding to the calculated average value of compression information is applied to recompress the image data by the compression parameter at the middle level between low compression and high compression. According to the automatic mode, any large degradation in image and any increase in data amount can be prevented.

Image Quality Priority Mode

A compression parameter for lowest compression is selected from image data of a plurality of pages as a quantization coefficient to be assigned. With this processing, the entire image quality can be increased.

As is apparent from the above description, conventionally, since a compression parameter for high compression is used to recompress generated image data, the image degrades in recompression although the data amount after recompression can be reduced. According to this embodiment, the user can arbitrarily select a compression parameter. Hence, a compression parameter suitable for each situation can arbitrarily be selected by, e.g., selecting a compression parameter for high compression with priority on the size or selecting a compression parameter for low compression with priority on the image quality. Hence, the convenience for the user increases.

Fifth Embodiment

In the first embodiment, in both print output and transmission, a compression parameter corresponding to the average value of compression information is assigned as one compression parameter reassigned in place of different compression parameters. However, the present invention is not limited to this. For example, a compression parameter assigned for each function of the MFP may be calculated automatically.

More specifically, in the copy function and PDL print function, high-quality image data is required. Hence, a compression parameter selected in the image quality priority mode described in the fourth embodiment is used for recompression.

On the other hand, in Internet transmission, reduction of the data amount is necessary in consideration of the transfer load and transfer time in transmission. When browsing on the screen of a personal computer is taken into consideration, a high image quality is also required. Hence, a compression parameter applied in the automatic mode described in the fourth embodiment is used for recompression.

In fax transmission, reduction of the data amount is essential in consideration of the transfer load and transfer time in transmission and charging for use of the public line. Hence, a compression parameter applied in the size priority mode described in the fourth embodiment is used for recompression.

As is apparent from the above description, according to this embodiment, the compression parameter extraction method is automatically changed for each function of the MFP. Hence, optimum compression parameter assignment for each function can be implemented.

Sixth Embodiment

In the fifth embodiment, the compression parameter extraction method can automatically be changed for each function. However, the present invention is not limited to this. For example, a user interface described in the fourth embodiment may be provided for each function, and the operator may arbitrarily change the extraction method.

Seventh Embodiment

In the first embodiment, input image data has been described as image data obtained from the scanner unit 101 or PDL rendering unit 102. However, image data received via the LAN 112 or public line 113 may be handled as input image data.

Alternatively, image data transferred from a storage device such as a PC card, USB memory, or external hard disk connected to a PCI bus slot or an external expansion interface such as a USB 2.0 or IEEE 1394 may be handled as input image data. Image data stored in the hard disk 110 may be handled as input image data.

Eighth Embodiment

The functions of an MFP 100 are not limited to reduction layout, bookbinding, copy, print, Internet transmission, and fax transmission. The present invention is applied in association with a function of reassigning one predetermined compression parameter to image data compressed by using a plurality of different compression parameters. In addition, the present invention is applied not only to an MFP but also a device or program capable of compressing and decoding (decompressing) digital data.

Other Embodiment

The present invention may be applied to a system including a plurality of devices (e.g., a host computer, interface device, reader, and printer) or an apparatus including a single device (e.g., a copying machine or facsimile apparatus).

The object of the present invention is achieved even by supplying a storage medium which records software program codes to implement the functions of the above-described embodiments to the system or apparatus and causing the computer (or CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention.

As the storage medium to supply the program codes, for example, a floppy (registered trademark) disk, hard disk, optical disk, magnetooptical disk, CD-ROM, CD-R, magnetic tape, nonvolatile memory card, or ROM can be used.

The functions of the above-described embodiments are implemented not only when the readout program codes are executed by the computer but also when the OS (Operating System) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

The present invention is not limited to the above embodiments and various changes and modifications can be made within the spirit and scope of the present invention. Therefore, to apprise the public of the scope of the present invention, the following claims are made.

CLAIM OF PRIORITY

This application claims priority from Japanese Patent Application No. 2004-282480 filed on Sep. 28, 2004, which is hereby incorporated by reference herein.

What is claimed is:

1. An image processing apparatus for laying out a plurality of first image data in a single page to generate second image data, comprising:
    a decoding unit configured to decode the plurality of first image data which are compressed by using individual compression parameters;
    an extraction unit configured to extract, on the basis of the compression parameters of the plurality of first image data, a common compression parameter to compress the plurality of first image data and assigning the common compression parameter to the plurality of first image data;
    a recompression unit configured to recompress the plurality of first image data by using the common compression parameter assigned by said extraction unit; and
    an output unit configured to composite the plurality of first image data recompressed by said recompression unit as second image data in the single page and outputting the second image data, wherein said extraction unit calculates an average value of compression information to specify the compression parameters of the plurality of first image data and extracts a compression parameter corresponding to the calculated average value of the compression information as the common compression parameter.

2. The apparatus according to claim 1, wherein the compression information is a data amount ratio before and after compression processing when compression processing is executed by using the compression parameter of the first image data.

3. The apparatus according to claim 1, wherein the compression information is an identifier to identify the compression parameter of the first image data.

4. An image processing apparatus for laying out a plurality of first image data in a single page to generate second image data, comprising:
   a decoding unit configured to decode the plurality of first image data which are compressed by using individual compression parameters;
   an extraction unit configured to extract, on the basis of the compression parameters of the plurality of first image data, a common compression parameter to compress the plurality of first image data and assigning the common compression parameter to the plurality of first image data;
   a recompression unit configured to recompress the plurality of first image data by using the common compression parameter assigned by said extraction unit; and
   an output unit configured to composite the plurality of first image data recompressed by said recompression unit as second image data in the single page and outputting the second image data,
   wherein said extraction unit calculates an average value of compression information to specify the compression parameters of the plurality of first image data after weighting the compression information, and extracts a compression parameter corresponding to the calculated average value of the weighted compression information as the common compression parameter.

5. An image processing apparatus for laying out a plurality of first image data in a single page to generate second image data, comprising:
   a decoding unit configured to decode the plurality of first image data which are compressed by using individual compression parameters;
   an extraction unit configured to extract, on the basis of the compression parameters of the plurality of first image data, a common compression parameter to compress the plurality of first image data and assigning the common compression parameter to the plurality of first image data;
   a recompression unit configured to recompress the plurality of first image data by using the common compression parameter assigned by said extraction unit; and
   an output unit configured to composite the plurality of first image data recompressed by said recompression unit as second image data in the single page and outputting the second image data,
   wherein said extraction unit calculates an average value by using compression information except a maximum value and a minimum value of the compression information to specify the compression parameters of the plurality of first image data and extracts a compression parameter corresponding to the calculated average value of the compression information as the common compression parameter.

6. An image processing apparatus for laying out a plurality of first image data in a single page to generate second image data, comprising:
   a decoding unit configured to decode the plurality of first image data which are compressed by using individual compression parameters;
   an extraction unit configured to extract, on the basis of the compression parameters of the plurality of first image data, a common compression parameter to compress the plurality of first image data and assigning the common compression parameter to the plurality of first image data;
   a recompression unit configured to recompress the plurality of first image data by using the common compression parameter assigned by said extraction unit; and
   an output unit configured to composite the plurality of first image data recompressed by said recompression unit as second image data in the single page and outputting the second image data,
   wherein said extraction unit extracts the common compression parameter by calculating an average value of matrix values of the compression parameters of the plurality of first image data.

7. An image processing method of laying out a plurality of first image data in a single page to generate second image data, the image processing method performed on an image processing apparatus, comprising:
   a decoding step of decoding the plurality of first image data which are compressed by using individual compression parameters;
   an extraction step of extracting, on the basis of the compression parameters of the plurality of first image data, a common compression parameter to compress the plurality of first image data and assigning the common compression parameter to the plurality of first image data;
   a recompression step of recompressing the plurality of first image data by using the common compression parameter assigned in the extraction step; and
   an output step of compositing the plurality of first image data recompressed in the recompression step as second image data in the single page and outputting the second image data,
   wherein the extraction step calculates an average value of compression information to specify the compression parameters of the plurality of first image data and extracts a compression parameter corresponding to the calculated average value of the compression information as the common compression parameter.

8. A storage computer-readable medium characterized by storing a control program to cause a computer to implement an image processing method of claim 7.

9. An image processing method of laying out a plurality of first image data in a single page to generate second image data, the image processing method performed on an image processing apparatus, comprising:
   a decoding step of decoding the plurality of first image data which are compressed by using individual compression parameters;
   an extraction step of extracting, on the basis of the compression parameters of the plurality of first image data, a common compression parameter to compress the plurality of first image data and assigning the common compression parameter to the plurality of first image data;
   a recompression step of recompressing the plurality of first image data by using the common compression parameter assigned in the extraction step; and an output step of compositing the plurality of first image data recompressed in the recompression step as second image data in the single page and outputting the second image data, wherein the extraction step calculates an average value of compression information to specify the compression parameters of the plurality of first image data after weighting the compression information, and extracts a compression parameter corresponding to the calculated average value of the weighted compression information as the common compression parameter.

10. An image processing method of laying out a plurality of first image data in a single page to generate second image data, the image processing method performed on an image processing apparatus, comprising:

a decoding step of decoding the plurality of first image data which are compressed by using individual compression parameters;

an extraction step of extracting, on the basis of the compression parameters of the plurality of first image data, a common compression parameter to compress the plurality of first image data and assigning the common compression parameter to the plurality of first image data;

a recompression step of recompressing the plurality of first image data by using the common compression parameter assigned in the extraction step; and an output step of compositing the plurality of first image data recompressed in the recompression step as second image data in the single page and outputting the second image data, wherein the extraction step calculates an average value by using compression information except a maximum value and a minimum value of the compression information to specify the compression parameters of the plurality of first image data and extracts a compression parameter corresponding to the calculated average value of the compression information as the common compression parameter.

11. An image processing method of laying out a plurality of first image data in a single page to generate second image data, the image processing method performed on an image processing apparatus, comprising:

a decoding step of decoding the plurality of first image data which are compressed by using individual compression parameters;

an extraction step of extracting, on the basis of the compression parameters of the plurality of first image data, a common compression parameter to compress the plurality of first image data and assigning the common compression parameter to the plurality of first image data;

a recompression step of recompressing the plurality of first image data by using the common compression parameter assigned in the extraction step; and an output step of compositing the plurality of first image data recompressed in the recompression step as second image data in the single page and outputting the second image data, wherein the extraction step extracts the common compression parameter by calculating an average value of matrix values of the compression parameters of the plurality of first image data.

* * * * *